March 28, 1950 M. WALLACE 2,502,295

DOUBLE RANGE PANORAMIC RADIO RECEIVER

Filed Aug. 25, 1943 2 Sheets-Sheet 1

INVENTOR
MARCEL WALLACE
BY Darby & Darby
ATTORNEY

March 28, 1950 M. WALLACE 2,502,295

DOUBLE RANGE PANORAMIC RADIO RECEIVER

Filed Aug. 25, 1943 2 Sheets-Sheet 2

INVENTOR
MARCEL WALLACE
BY Darby & Darby
ATTORNEY

Patented Mar. 28, 1950 2,502,295

UNITED STATES PATENT OFFICE 2,502,295

DOUBLE RANGE PANORAMIC RADIO RECEIVER

Marcel Wallace, New York, N. Y., assignor, by mesne assignments, of one-half to Marcel Wallace, doing business as Panoramic Laboratories, New York, N. Y., and one-half to Panoramic Radio Corporation, New York, N. Y., a corporation of New York Application August 25, 1943, Serial No. 499,885

17 Claims. (Cl. 250—20)

My invention relates to radio receivers of the panoramic type, particularly to means for increasing the range of the receiver and the number of signals that may be received and indicated by such a receiver.

This application is a continuation-in-part of my copending application Serial No. 357,814, filed September 21, 1940, now U. S. Patent #2,378,604, issued June 19, 1945, and entitled "Radio altimeter and panoramic reception."

The conventional panoramic receiver comprises an aperiodic or broad band-pass input circuit and a frequency converter with a local oscillator which may be periodically varied in frequency over a predetermined range so that all the signals within the range, combined with the oscillator input, are periodically passed through a connected narrow band I. F. amplifier. By synchronizing the scanning excursions of the oscillator with a sweep voltage of a cathode ray oscilloscope, the signals received can be made to produce apparently steady deflections or signal images on the screen.

In such a receiver certain minimum spacings between images on the screen must be maintained to avoid overlapping and confusion of images, and for a given screen size there is a definite limit to the number of signals that may be simultaneously shown.

Further, in some uses of the panoramic receiver it is desirable to reproduce signal images of carrier frequencies in widely spaced bands and to show the wanted images in some detail while eliminating the signals between the two bands. If the information received in the spaced bands are unrelated, as when, for example, direction or beacon signals are received on one band and altitude signals on another, it is desirable to show the images on different base lines on the screen to avoid confusion.

For other uses it is desirable to reproduce signal images in closely spaced bands where one and the same signal, as received through different circuits, or adjacent signals, may be compared in amplitude. In this case it is desirable to show the signals to be compared on the same base line on the screen.

The principal object of my invention is to increase, on a single cathode ray screen of a panoramic receiver, the number of useful signal images which can be shown at one time.

A more specific object of my invention is an improved panoramic receiver having a cathode ray tube oscilloscope with means for showing simultaneously the signals in a plurality of radio frequency bands, whether the bands are spaced apart or constitute continuous end-to-end portions of the spectrum.

My invention is defined with particularity in the appended claims, and preferred embodiments thereof are described in the following specification and shown in the accompanying drawing, in which:

According to my invention, I can simultaneously receive with a panoramic receiver two bands of frequencies which can be observed on two different portions of the oscillograph tube. This is a very important requirement if the receiver is to be used for navigational purposes, so as to avoid carrying on board several receivers. It may be assumed, for example, that a flier wishes to receive radio signals from a string of radio range beacons and also from transmitters on dangerous obstacles, fixed or mobile. The string of beacons may operate on one continuous band of frequencies different from the altitude frequency band that may be employed by the transmitters on the obstacles. An electronically controlled receiver showing simultaneously two bands of frequencies can be used according to my invention. Such results can be obtained in the following manner: I provide means for generating a "square-wave" voltage. By this I mean that I produce a series of electrical impulses of a constant amplitude, each such impulse having a duration which may, or may not, be equal to the duration of one sawtooth cycle, as it will be shown below. These impulses are intermittent, each being followed by an equal time period when no voltage is generated, or when voltage of a reversed polarity is generated.

Figure 1:
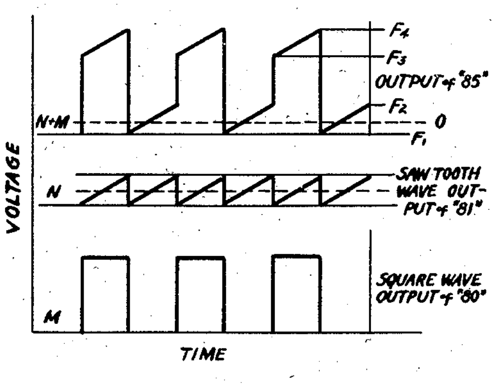
Figure 1 is a graph of cathode ray tube deflection voltage according to my invention.

Figure 1 shows on its lower part as M three such square-wave voltage impulses which is this example are synchronized with the sawtooth voltage; N represents six cycles as synchronous impulses and M+N represents an alternating current resulting from the combination or additions of these two types of impulses. A frequency modulating tube for the heterodyne oscillator, in the block F of the diagram, Figure 2, has a circuit for feeding a current to the oscillator such as the one represented as M+N to alternately cover two bands of frequency whose separation from each other will be determined by the amplitude of the square-wave input.

On the right side of Figure 1, I show an ordinate representing frequency variation as produced by such a combination wave in the variable frequency oscillator. It alternately covers the frequencies $F_1$ to $F_2$, and $F_3$ to $F_4$. The frequency separation between $F_2$ and $F_3$ can be reduced to zero by reducing the amplitude of the square-wave voltage or be increased to a maximum by increasing that voltage. It can, therefore, be seen that variations of amplitude of M will shift only one band of frequencies ($F_3$ to $F_4$), and will not affect the other band. This shift can be obtained in the simplest manner by applying the square-wave directly to the biasing potentiometer or resistance 70, of the frequency control tube, Figure 3.

Figure 2:
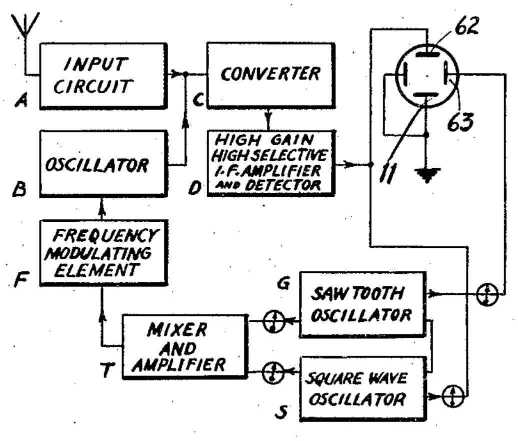
Figure 2 is a block diagram of the essential elements of my improved receiver.

Figure 2 represents a block diagram showing the relation of the essential elements of my receiver. The same letters are used as in Figure 3 for the common elements of the receiver. In Figure 2 S represents the square-wave generator, and T the mixer of the sawtooth and square-wave currents. In addition to being mixed, the sawtooth component is applied to one of the deflecting plates 63 of the cathode ray tube and the square-wave component to another deflecting plate 62, normal to the first, where it is combined with the signal from the channel D.

The effect of this application of the square-wave is to recurrently, and at the end of each cycle of the sawtooth wave, shift the frequency sweep axis of the cathode ray tube, so as to alternately obtain two parallel lines on which the signals contained in the bands $F_1$ to $F_2$ and, respectively, $F_3$ to $F_4$ will appear.

The linear separation between these two parallel frequency sweep axes is a function of the amplitude of the square-wave voltage applied to the deflecting plate 62, and this is controlled through any appropriate means.

Figure 3:
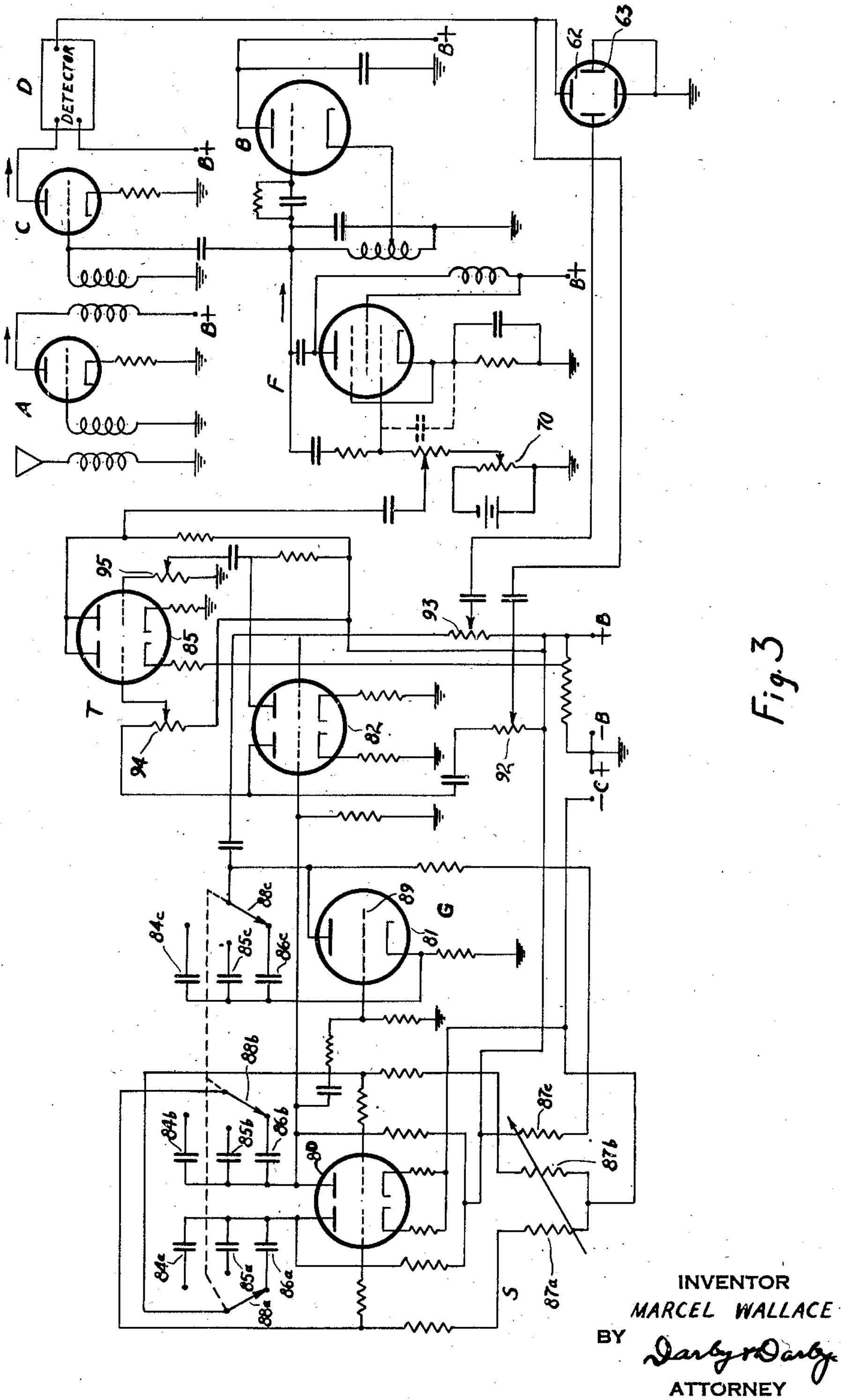
Figure 3 is a circuit diagram of the receiver of Figure 2.

Figure 3 shows a detailed diagram of the elements A, B, C, D, F, G, S and T of Figure 2. The square-wave generator S may comprise two vacuum tubes such as two triodes or a double triode 80 which are cross-connected in such a way that each triode section becomes alternately blocked. The frequency of this blocking action is determined by the rate of charge and discharge of condenser pairs 84, 85, 86 (groups *a* and *b*), a pair of which are selected by switch arms 88*a* and 88*b*, and also by the value of the dual rheostats 87*a* and 87*b*.

Another tube 81 acts as a sawtooth generator and the frequency controlling elements, that is, condensers 84*c*, 85*c*, 86*c* and rheostats 87*c*, are so chosen that they produce a sawtooth current, preferably of twice the frequency of the square-wave current.

Synchronism of the sawtooth and square-wave may be obtained by connecting the grid 89 of tube 81 to one of the plates of the tube 80. The frequency control of both tubes is, therefore, obtained by single controls 88*a*, 88*b*, 88*c* and 87*a*, 87*b*, and 87*c*.

Tube 82 is another double triode which is used in the event that high signal voltages are required. Tube 82 acts as an amplifier for the sawtooth and square-wave voltages.

The amplitude controls 92 and 93 are used to control the voltage of the deflecting currents put into the vertical and horizontal deflecting plates respectively, of the cathode ray tube and the amplitude controls 94 and 95 are used to control the voltages applied to the grids of the mixing tube 85 (T in Figure 2). The mixed current obtained from the plates of this tube is applied to the frequency controlling tube F.

The combined sawtooth and square-wave of the form shown at N+M in Figure 1, in the output of mixing tube 85, is impressed upon a frequency determining circuit of the heterodyne oscillator B, so that the oscillator frequency becomes a function of and varies according to the N+M voltage. The frequency determining circuit comprises a vacuum tube known as a reactor tube, the cathode-anode space of which is connected across the inductance of the tank circuit of the oscillator B. Voltages across the tank circuit are impressed upon the input electrodes of reactor tube F and because of the phase shifting capacity across the grid and cathode, the phase of the tank voltage impressed upon the grid is displaced with respect to the tank voltage. The resulting space current through tube F is accordingly out-of-phase with the tank current, and retunes the tank as effectively as though capacity or inductance changes were made. To the input of converter tube C, is applied the variable sweep voltages of the oscillator B and the radio frequency signals from the R. F. circuits of amplifier A. The converted signals are passed through a narrow pass filter, are rectified in detector D, and impressed upon the vertical deflection plates 62 of my cathode ray oscilloscope.

Upon the screen of the oscilloscope will appear two horizontal base lines, each with deflection loops or images of the signals received respectively, in bands $F_1$ to $F_2$ and $F_3$ to $F_4$.

Figure 4:
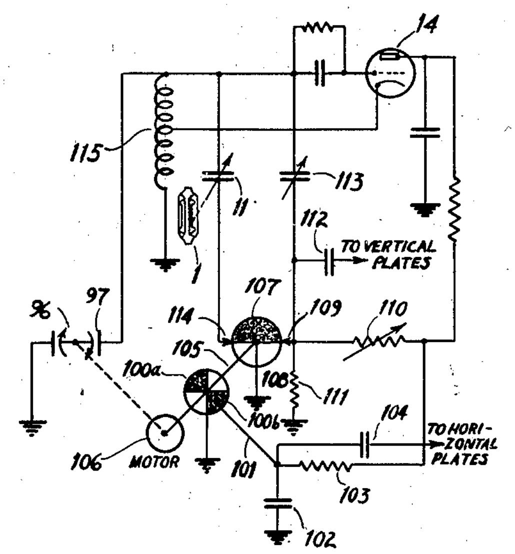
Figure 4 shows mechanical, as distinguished from electrical means, for scanning a plurality of frequency bands.
Figure 5:
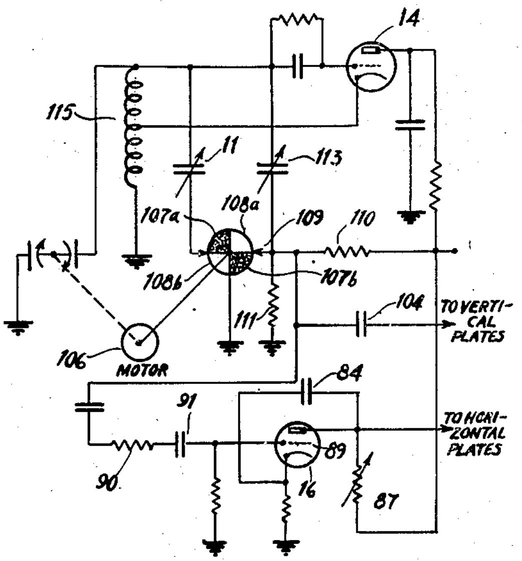
Figure 5 shows combined mechanical and electrical means for scanning a plurality of frequency bands.

The same results, as obtained by purely electronic means of tuning, can very well be obtained by either purely mechanical means as shown in Figure 4 or combined electronic and mechanical means as shown in Figure 5. The mechanically frequency modulated oscillator is quite practical and readily made. A rapidly rotating motor driven condenser produces the frequency shift required. One precaution, however, must be taken in avoiding frictional contacts in the tuned circuit, which are invariably noisy, mostly at high frequencies. The best method to avoid this is by using insulated or floating rotors, varying the capacity between two opposite stators. Another precaution which must be taken is to properly balance the rotors dynamically, so as to avoid vibration. This can be obtained by using rotors having several blades, two, three or more.

The effect of such multi-bladed rotors is to speed up the scanning rate for a given motor speed. In ultrahigh frequency work, where the periodical variation of capacity required is quite small and amounting only to a few micro-microfarads, I prefer to obtain the capacity variations necessary by simply rotating a rotor of high dielectric constant between two stator plates connected in the tuned circuit. Several such dielectric rotors can be coupled on one shaft to tune as many circuits as required. One of these rotors can be used for mechanically producing a source of sweep voltage by the periodical charge and discharge of a condenser. Figure 4 shows an example of such a construction, in which 96 represents the two blades of a dielectric rotor having a 90° opening and rotating between a pair of stator blades 97.

The center of this rotor has a metal bushing which is grounded through its shaft and the motor 106 rotating it. Two small metal sectors 100a, 100b of a commutator on the rotor shaft engage a brush 101 which rides alternately over the dielectric and over the grounded metal sectors of the commutator in such a way as to pass from metal to dielectric exactly at the moment of maximum or minimum capacity of the condensers 96—97. This brush periodically discharges condenser 102 to the ground which condenser becomes charged through a resistor 103 when the brush rides over the dielectric.

The condenser 102 becomes a mechanical source of sweep voltage which is noiseless because the only frictional contact which takes place is to either the dielectric or to a grounded part of the receiver, which is not a part of the tuned circuit.

The electrical connections of such a synchronized dielectric condenser and sweep voltage generator are shown in Figure 4, in which for the sake of simplicity, I show only one periodically tuned circuit, an oscillator which can be the element B of the block diagram. The synchronized condenser and sweep generator replace the elements F and G of the diagram.

By a slight addition to this construction, I can obtain an alternating coverage of two bands shown on two different lines on the screen of the cathode ray tube.

On the same shaft 105 of this rotor, I mount a commutator composed of two equal sectors 107 and 108, Figure 4, of double the opening of the blades 96—97, or 180°. One of these sectors is of metal and grounded to the shaft, and thence to the chassis; the other sector is of an insulating material. A brush 109 is connected to a high resistance potentiometer 110—111, connected on one side to a source of direct current (anode supply for example), and grounded on the other side. This brush will be alternately at a certain voltage or at ground potential, as the commutator rotates; a square-wave is mechanically produced, and can serve through condenser 112 for shifting the frequency axis on the cathode ray tube as explained before. The same commutator with brush 114 and 109 can serve for alternately selecting one of two condensers 11 and 113 which tune the oscillator circuit respectively, to the frequency ranges $F_1$—$F_2$ and $F_3$—$F_4$ to be scanned. Commutator 107—108 can also serve for mechanically shutting off or reducing the power of an altitude-indicating oscillator, as described in my copending application. Such a mechanical commutator can be made to open the cathode circuit of the oscillator for predetermined periods of time corresponding to the angle of the commutator sectors.

The different frequency bands are, therefore, alternately covered by the rotating condenser 96—97 previously described. By individually tuning the condensers 11 and 113, each band may be separately tuned. Condenser 11 can, if desired, be controlled by a pressure controlled device such as an altimeter or aneroid cell 1, whereas the condenser 113 can be controlled for special purposes.

The motor driven condenser and commutator arrangement of Figure 4 can be fully adapted to the receiver of Figure 2.

The type of mechanical sweep by means of rotating commutators described has one disadvantage: One part of the images are lost by grounding the condenser 102 part of the time. The result of this is more tendency to flicker and less brilliancy of the image. I can, however, advantageously combine electronic tuning and mechanically produced periodical voltage with elimination of this disadvantage, as shown in Figure 5.

In Figure 5 the condenser 102 has been replaced by a sawtooth oscillator 16 whose grid 89 is synchronized to a mechanical square-wave generator similar to the one heretofore described, but using the 90° sectors 107a, 108a, 107b, 108b.

This form of sector alternately switches in the tuning circuit condensers 11 and 113, at double the rate obtained before. The number of images obtained on the screen is double, because each alternate sawtooth cycle serves to put on the screen one of the frequency bands covered.

Special condensers giving variations of capacity from minimum to maximum over a greater portion of a rotating cycle, however, (270° or more) can be used advantageously to reduce the loss of images mentioned above.

My improved panoramic receiver has a cathode ray oscilloscope showing simultaneously the signals in a plurality of radio frequency bands. The number of useful signals that may be shown is increased without overlapping or confusion among signal images for a given screen size, and for given circuit resolution. My improved panoramic receiver is simple in construction, and reliable in operation.

In those applications where the bands are required to overlap in frequency over a great portion, I prefer to show the signals side by side on the same base line. In this case, referring to Figure 3, the vertical plate 62 of the cathode ray tube may be disconnected from the potentiometer 92 so that the square wave is not applied to the cathode ray tube directly. With this connection removed the device may still compare two signals, as the square wave is still applied to the reactor tube and through it causes the oscillator alternately to scan two different bands, thus allowing visual comparison of the received signals on the same base line. There is no necessity for synchronizing the sawtooth wave which gives a continuously progressive motion to the spot on the screen, with the square wave which shifts the bands of reception, provided the square wave has no "sloping shoulders."

What is claimed is:

1. In combination, a signal receiving circuit, a converter tube and an oscillator operatively coupled together, a narrow bandpass intermediate frequency amplifier coupled to the output of the converter, an oscilloscope with sweep deflecting means and a signal deflecting means, connecting means between the said amplifier and said signal deflecting means, means modulating the frequency of said oscillator in synchronism with the oscilloscope sweep, and means alternately applying different predetermined steady voltages to said signal deflecting means and to the said means modulating the frequency.

2. In combination, a high frequency signal input circuit, a converter, an oscillator, a grid controlled reactor tube for modulating the oscillator, the oscillator and input circuit being coupled to the input of said converter, a cathode ray oscilloscope with vertical deflecting means and horizontal deflecting means, the vertical deflecting means being coupled to the output of the converter, a generator of voltage waves of sawtooth shape, a generator of voltage waves of square wave shape, connections between said two generators and the grid of the reactor tube for modulating the frequency of the oscillator in accordance with the two waves, connections between the sawtooth generator and the horizontal deflecting means, and means scanning the signals of the input circuit and impressing voltage corresponding to the signals on said vertical plates.

3. In combination, a signal receiving circuit, a converter tube, and an oscillator operatively coupled together, a narrow bandpass intermediate frequency filter, an oscilloscope with sweep deflecting means and with signal deflecting means, the signal deflecting means being coupled through said filter to the output of the converter, and a square wave generator with connections to the signal deflecting means and to the oscillator, modulating the frequency of the oscillator.

4. In combination, a cathode ray oscilloscope with horizontal and vertical cathode beam deflecting means, a sweep circuit connected to the horizontal deflecting means, a signal selecting circuit coupled to the vertical deflecting means, means for alternately tuning said selecting circuit over a predetermined first band of frequencies and over a predetermined second band of frequencies, and bias means alternately applying different predetermined steady voltages to the vertical deflecting means and causing the alternations of tuning.

5. In a signal receiving and indicating system, a signal receiving circuit, a cathode ray oscillograph having two sets of deflecting elements, two sources of periodic current of predetermined waveform, means controlled by both of said sources for tuning the said signal receiving circuit over predetermined bands of the frequency spectrum, means for connecting the first set of deflecting elements to said signal receiving circuit, and means for connecting the second set of deflecting elements to the first of said sources.

6. In a signal receiving system as set forth in claim 5, means for additionally connecting the first set of deflecting elements to the second of said sources.

7. In combination, a signal receiving circuit, a converter tube, an oscillator operatively coupled to the circuit and the tube, and a frequency controlling means for the oscillator, a narrow bandpass intermediate frequency filter, an oscilloscope with sweep deflecting means and signal deflecting means, the signal deflecting means being coupled through said filter to the output of the converter, and means including a square-wave generator with connections to the said frequency control means, for alternately producing two spaced frequency bands to energize the signal deflecting means.

8. In a panoramic receiver, the combination with a signal receiving circuit, a local oscillator and a converter for receiving and combining voltage waves from both circuits, of means for controlling the oscillator to vary its frequency input to the converter and thereby vary the output frequency from the converter; a cathode ray oscilloscope having vertical deflecting means and horizontal deflecting means, one of said means being energized from the converter according to the output frequency from the converter; and means for controlling the oscillator control means and the oscilloscope to select and show the frequency data in selected bands of the frequency spectrum available through the signal-receiving circuit, said controlling means comprising a sawtooth oscillator to provide a sweep time interval during which the frequency of the frequency oscillator is varied; a square-wave oscillator; means synchronizing the operation of the sawtooth and the square-wave oscillators; and means responsive to voltage waves from the saw-tooth oscillator and from the square-wave oscillator for controlling the output frequency of the frequency oscillator within the bands of the frequencies to be examined.

9. In a panoramic receiver, the combination with a signal receiving circuit, a local oscillator and a converter for receiving and combining voltage waves from both circuits, of means for controlling the oscillator to vary its frequency input to the converter and thereby vary the output frequency from the converter; a cathode ray oscilloscope having vertical deflecting means and horizontal deflecting means, one of said means being energized from the converter according to the output frequency from the converter; and means for controlling the oscillator control means and the oscilloscope to select and show the frequency data in selected bands of the frequency spectrum available through the signal-receiving circuit, said controlling means comprising means for generating a voltage wave of predetermined shape through successive time intervals and applying such voltage to the frequency oscillator control means, and means for modifying the potential of said voltage wave during spaced selected time intervals, thereby to control the frequency generation of the frequency oscillator throughout different frequency bands.

10. In a panoramic receiver, the combination with a signal receiving circuit, a local oscillator circuit and a converter for receiving and combining energy waves from both circuits, of means for controlling the oscillator to vary its frequency and thereby vary the output frequency from the converter; a cathode ray oscilloscope having vertical deflecting means and horizontal deflecting means, one of said deflecting means being energized from the converter; means for generating a sweep voltage through successive time intervals and connected to energize the other of the deflecting means of the oscilloscope and to energize the oscillator frequency-controlling means to cause said frequency-controlling means to vary the oscillator frequency synchronously with the energization of the other of the deflecting means; and means synchronized with the sweep voltage generator and operative to periodically modify the control action of the sweep voltage on the means controlling the frequency of the local oscillator.

11. An oscilloscopic system comprising, in combination, selective means for cyclically scanning at a predetermined rate a pretermined subject and selecting in succession in the course of each cycle effects appearing at various points therein, oscilloscopic means for marking the selected effects individually along a multiplicity of separated reference lines, said oscilloscopic means including means for driving said marking means along said reference lines in cyclically repeated succession, and means for speeding up the said scanning during the periods within each scanning cycle during which said marking means passes from one of said lines to another of said lines.

12. In combination, selective means for cyclically scanning at a relatively slow rate a predetermined subject and selecting in succession effects appearing at different points therein, oscilloscopic means for cyclically traversing a predetermined path and visually indicating the selected effects at respectively corresponding points along said path, said path comprising a multiplicity of separated portions along which all of the selected effects are to be indicated, and scanning control means for effecting a relatively rapid scan of said selective means relative to said subject in the periods during which the path between said separated path portions is being traversed.

13. In combination, selective means for cyclically scanning a predetermined subject at a relatively slow rate and selecting in succession effects appearing at different points therein, oscilloscopic means for cyclically traversing a predetermined path and visually indicating the selected effects at respectively corresponding points along said path, said path comprising a multiplicity of separated portions along which all of the selected effects are to be indicated, and scanning control means for effecting a relatively rapid scan of said selective means through said subject in the periods during which the path between said separated path portions is being traversed, said scanning control means comprising means for temporarily modifying said first mentioned scanning rate of said selective means through said subject within the said periods.

14. In combination, cathode-ray oscilloscopic means, sweep circuit means adapted to drive the cathode ray cyclically along a predetermined path comprising a multiplicity of disconnected path portions, frequency scanning means for cyclically scanning at a predetermined rate a predetermined wave frequency range and selecting in succession wave effects of different frequencies appearing in said range, said scanning means having a cyclical rate such that it progresses once across said frequency range while said cathode ray covers said multiplicity of path portions, means operative on said scanning means for speeding up net progression of the said scanning means across said frequency range in the periods within each scanning cycle during which the cathode ray passes from one of said path portions to the next, and means for varying said cathode ray under the control of the wave effects selected by said scanning means.

15. In combination, frequency translating means having wave input means for the simultaneous application of any waves lying within a predetermined frequency range and wave output means, voltage-responsive means for varying the extent of translation effected by said frequency translating means, means for applying to said responsive means a periodically varying voltage which throughout a substantial part of each period of its variation changes substantially continuously and progressively in the same sense of change with relatively brief intermittent changes in the opposite sense, means for visually indicating the waves present in said range comprising an oscilloscope and frequency selective means connecting said oscilloscope and said wave output means.

16. In combination, selective means for cyclically scanning a predetermined subject and during each cycle selecting in succession effects appearing at discrete points therein, voltage-responsive means for controlling the progression of said scanning means through said subject, means for effectively halting the said progression of said scanning means repeatedly during each cycle comprising means for applying a periodic voltage wave to said voltage-responsive means, a cathode-ray tube, cathode-ray directing means adapted to drive the cathode ray around a predetermined path periodically in isochronism with the cyclical scanning, and ray controlling means responsive to the effects successively selected by said scanning means.

17. A panoramic receiver comprising a modulator having input means for receiving signals of different frequencies, a variable-frequency oscillator connected to supply beating oscillations to said modulator, the frequency of said oscillator being dependent on the magnitude of a control voltage supplied thereto, means for supplying to said oscillator a periodic control voltage which throughout a plurality of separated parts of its period changes in value in the same direction, the initial value in each said part except the first being substantially equal to the final value in the next preceding part and the interval separating said parts being small in comparison with the lengths thereof, filter means connected to the output of said modulator for selecting the received signals in periodically repeated succession, a cathode ray tube, ray deflecting means for driving the cathode ray along a multiplicity of separated path portions in succession in such timed relation with the changes in said periodic voltage that the ray passes from the end of one path portion to the beginning of the next substantially wholly within the interval separating respectively corresponding parts of the control voltage period, and ray controlling means responsive to the signals selected by said filter means for separately indicating the several signals along said path portions.

MARCEL WALLACE.

REFERENCES CITED

The following references are of record in the file of this patent:

UNITED STATES PATENTS

| Number | Name | Date |
|---|---|---|
| 2,082,317 | Barber | June 1, 1937 |
| 2,098,695 | Southwick | Nov. 9, 1937 |
| 2,159,790 | Freystedt et al. | May 23, 1939 |
| 2,178,074 | Jakel et al. | Oct. 31, 1939 |
| 2,189,549 | Hershberger | Feb. 6, 1940 |
| 2,275,460 | Page | Mar. 10, 1942 |
| 2,279,246 | Podliasky et al. | Apr. 7, 1942 |
| 2,312,203 | Wallace | Feb. 23, 1943 |
| 2,405,238 | Seeley | Aug. 6, 1946 |

FOREIGN PATENTS

| Number | Country | Date |
|---|---|---|
| 518,031 | Great Britain | Feb. 15, 1940 |
| 834,082 | France | Nov. 10, 1938 |